United States Patent

[11] 3,573,870

| [72] | Inventors | Robert L. Gastineau;<br>James E. Kalasky, Dayton, Ohio |
|---|---|---|
| [21] | Appl. No. | 773,402 |
| [22] | Filed | Nov. 5, 1968 |
| [45] | Patented | Apr. 6, 1971 |
| [73] | Assignee | United Aircraft Products, Inc.<br>Dayton, Ohio |

[54] RETAINING RING FOR SEALING ASSEMBLY
2 Claims, 4 Drawing Figs.

| [52] | U.S. Cl. | 277/11,<br>277/180, 285/363 |
|---|---|---|
| [51] | Int. Cl. | F16l 23/00 |
| [50] | Field of Search | 285/363,<br>368; 277/180, 11, 189 |

[56] References Cited
UNITED STATES PATENTS

| RE11,858 | 9/1900 | Merwarth | 285/363X |
|---|---|---|---|
| 695,174 | 3/1902 | Roller | 285/363X |
| 2,914,350 | 11/1959 | Smith | 285/363X |
| 3,302,953 | 2/1967 | Glasgow | 285/363X |

FOREIGN PATENTS

| 891,820 | 12/1943 | France | 285/363 |
|---|---|---|---|

*Primary Examiner*—Thomas F. Callaghan
*Attorney*—J. E. Beringer

ABSTRACT: A retainer ring for use in a sealing assembly further comprising an O-ring seal, the retainer ring having a solid wirelike construction and being formed with peripheral lugs in the same plane which interfits with fastener bolts for positioning of the sealing assembly.

PATENTED APR 6 1971

3,573,870

INVENTORS
ROBERT L. GASTINEAU
JAMES E. KALASKY

BY
*J E Beringer*

THEIR ATTORNEY

RETAINING RING FOR SEALING ASSEMBLY

This invention relates to static sealing assemblies as installed in coupled fluid flow members and the like. The invention has special reference to sealing assemblies for use in joints having flat sealing surfaces between which an O-ring is compressed.

An installation as described has no integral groove to receive the O-ring. It is, accordingly, unable itself to provide for important requirements in an O-ring installation, including that of furnishing a positive backup for the O-ring and that of controlling O-ring compression. A positive or mechanical backup insures proper positioning of the O-ring and avoids overstressing by radially applied pressure forces. Controlled compression loading is important in order that the degree of O-ring squeeze, and thereby the extent of inherent springback, may be predetermined. Also, it is necessary to avoid overstressing of the O-ring in a longitudinal sense caused by an application of excessive clamping pressures by the sealing surfaces.

The instant invention provides a sealing assembly which can be installed in an ungrooved joint structure and provide in and of itself the necessary features of mechanical backup and controlled compression loading. To achieve a sealing assembly and a composite joint structure so characterized is an object of the invention. According to a feature of the invention the sealing assembly comprises a ring retainer which can be quickly and economically constructed and which offers physical advantages in positive positioning of the sealing assembly and secondary sealing.

Other objects of the invention will appear from the following description, when read in connection with the accompanying drawings, wherein.

Figure 4:
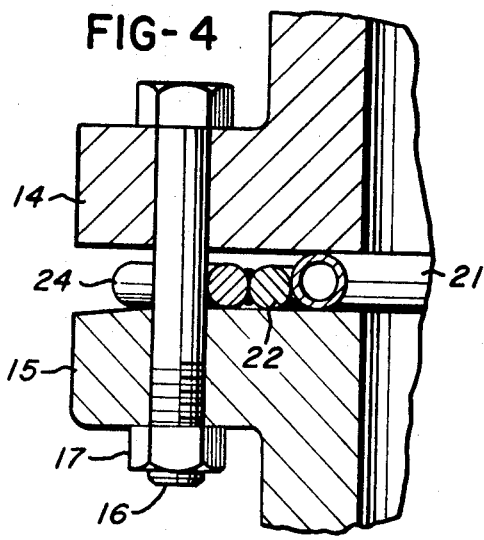
FIG. 4 is a fragmentary view similar to FIG. 1, showing the joint prior to application of a compression loading to the sealing assembly.
Figure 3:
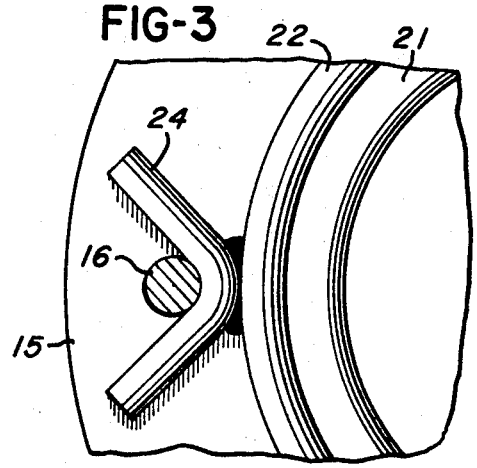
FIG. 3 is a fragmentary view taken transversely through the sealed joint of FIG. 1, substantially along the indicated line 3—3 thereof.

The invention is susceptible of embodiment in substantially all jointed structures in which an O-ring is interposed as a static seal. In the illustrated instance tubular members 10 and 11 have central flow passages 12 and 13 respectively for flow of a pressure fluid therethrough. The members 10 and 11 have respective circular flanges 14 and 15. A circumferential series of bolts 16 are installed in to interconnect the flanges 14 and 15. A nut 17 on the lower end of each bolt provides a means to enforce a relative approaching motion of the coupling members or to allow a separating motion thereof. The arrangement places the coupling members 10 and 11 in an opposing relation. Inner ends thereof face one another and provide opposed seating surfaces 18 and 19. An assembled relation of the parts, with bolts 16 in place, aligns flow passages 12 and 13 for transport of a flowing fluid under pressure. The opposing faces of the coupling members define a joint required to be sealed against an escape of such pressure fluid.

A sealing assembly for installation in such joint comprises a hollow metallic O-ring 21 and an encircling retainer ring 22. The sealing assembly is placed on and between seating surfaces 18 and 19 in a surrounding relation to the flow path defined by aligned passages 12 and 13. A pressural contact of the seating surfaces with diametrically opposed areas of the O-ring 21 produces a seal of such surfaces.

Figure 1:
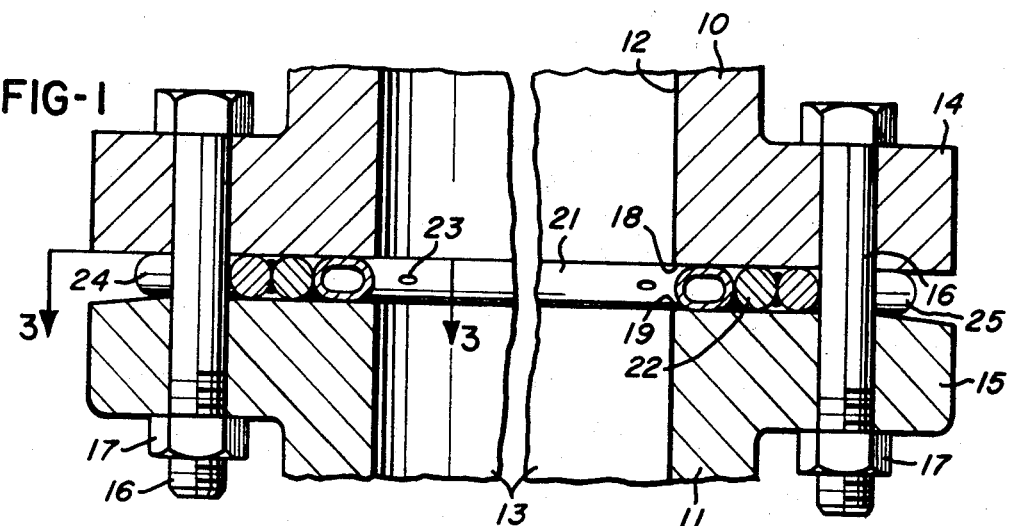
FIG. 1 is a view in cross section of a sealed joint in accordance with the illustrated embodiment of the invention.

The O-ring 21 is normally round in cross section and is compressed by the pressural engagement of surfaces 18 and 19 to a more flattened contour as shown in FIG. 1. Radial openings 23 in the ring provide for self energizing thereof, that is, for an internal pressurizing of the ring in correspondence with the pressure of the fluid under control.

Figure 2:
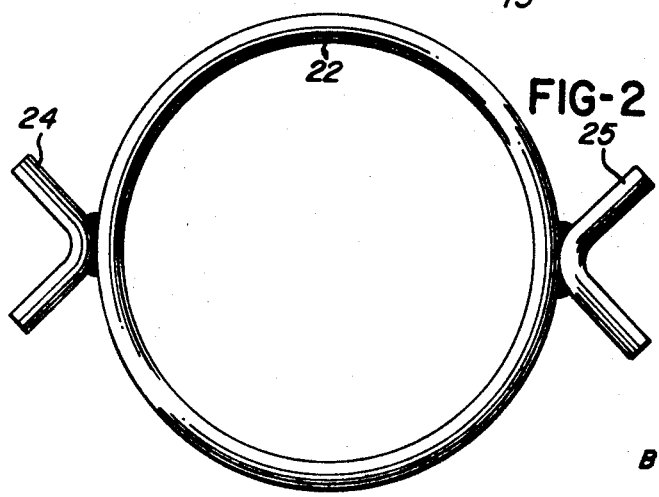
FIG. 2 is a plan view of a retainer member as comprised in the sealing assembly of FIG. 1, shown at a relatively reduced scale.

The retainer ring 22 is, in accordance with a feature of the invention, made of solid wire stock, butt welded or otherwise formed to a continuous circular configuration as indicated in FIG. 2. The wire is round in cross section and has a diameter selected to correspond to the desired flattened height of an installed O-ring. On the outer periphery of the ring 22, at diametrically opposed points thereon are welded segments 24 and 25 of the same wire stock. The segments 24 and 25 are bent to an approximately V configuration and are welded at their intermediate base portions to the ring. The ends of the lugs extend outwardly as divergent arms.

In the installation or assembly of the described structure, an O-ring 21 is encircled by a retainer member 22 and the parts may assume a connected relation with the O-ring pressed lightly into the encircling retainer member. The assembly comprising the O-ring and retainer member is inserted between the seating surfaces 18 and 19 of coupling members 10 and 11 and bolts 16 are installed. The bolts pass through or between the embracing arms of lugs 24 and 25, the construction and arrangement of parts being such that the bolt nests in complementary fashion within the curved base portion of the lugs joining the divergent arms thereof. The result is to bring about an accurately controlled positioning of the sealing assembly between surfaces 18 and 19. This position is maintained throughout subsequent assembly steps irrespective of joint attitude. In this connection, pipe couplings and the like frequently are effected with the flanges or bolt circles of the joint in a vertical position, or at right angles to the position as shown in FIG. 1 hereof. The cooperative interengagement or interfitting of the bolts 16 and lugs 24 precludes shifting or misaligning of the sealing assembly while the nuts 17 are being tightened and loosened to close and open the joint.

As the seating surfaces 18 and 19 are drawn in an approaching direction by tightening of the nuts 17 the surfaces initially make contact with the O-ring 21 which has a normal diameter exceeding the diameter of retainer ring 22. As the relative approaching motion is continued, the O-ring is compressed and assumes a working, compressed configuration as shown in FIG. 1 when the approaching motion of the seating surfaces is limited by contact with the solid wire retainer ring 22. The O-ring 21 has an inherent resilience and in attempting to resume its normal round configuration applies a resistant pressure to the surfaces 18 and 19. A seal of these surfaces thereby is effected, and, limited deflection or separation of such surfaces as might be caused by high internal pressures or temperature differentials are compensated for by a following, expanding action of the O-ring. The self energizing apertures 23 insure that pressures inside and outside the O-ring are balanced so that the O-ring is free to respond with its natural resilience to deflection of the seating surfaces.

The retainer ring 22 provides a positive encircling support for the O-ring, obviating its distortion under hoop tension or lateral displacement under pressure surges. Additionally, it limits and defines the extent of compression permitted the O-ring by approaching surfaces 18 and 19, the retainer ring having a suitably selected diameter. The extent of O-ring compression has a predictable relation to sealing capabilities of the ring.

The retainer ring 22, being in a preferred form of the invention made of wire stock, offers an economical means of providing a backup and pressuring limiting means in joint structures having no groove within which to mount an O-ring. The concept obviates the need of forming a groove in an existing joint structure. Further, it provides a means by which a retainer member may quickly and easily be formed by installers in the field. Factory made precision rings requiring special adaptation to individual joint structures are unnecessary. Still further, the round wire stock makes a curvilinear contact with the seating surfaces facilitating a stabilized seating of the coupling members thereon and introducing a concept of secondary sealing outward of the O-ring.

The bolts 16 are provided in a number sufficient adequately to close and secure the joint between members 10 and 11. The retainer ring member 22 may have two or more of the interfitting lugs 24 and 25. In the illustrated instance the retainer member has two such lugs adapted to engage respective bolts at diametrically different locations in the bolt circle. The invention has been disclosed as utilizing a self energized metallic O-ring as the sealing member. It will be understood, of course, that the invention is equally applicable for use with other types of sealing members having similar requirements in regard to mechanical backup and controlled compression loading.

The retainer ring has been disclosed as round in cross section since wire stock is most commonly found in this form, and also because the round configuration is most effective as a secondary seal. It could have other cross sectional slopes, such as square or rectangular. Indeed these forms might be preferable in installations requiring a high degree of resistance to hoop tension. Also, as long as the lugs 24 and 25 are of the same or less thickness than the retainer they need not have the same cross-sectional-shape, or even be made of the same material.

The bolts 16 have been described as nesting in the curved base portion of the lugs. It is of course a feature of the invention, however, that the divergent arms of the lugs accommodate bolts of varying diameter and adapt to variations in diametral spacing. The clearance between the bolts and the holes in which they fit tends to produce an inherent variation of this kind.

An O-ring pressed into place within an encircling retainer, and, if desired, adhesively bonded thereto forms a unitary assembly for storage and installation purposes.

Foregoing and other modifications in form, proportions and other details are possible without departing from the inventive principle as disclosed and claimed herein.

We claim:

1. A sealing assembly comprising a circular gasket adapted to be compressed between opposing seating surfaces and adapted to make a continuous contact with the seating surfaces for primary sealing, and a circular retaining ring circumferentially continuously contacting and supporting the outer periphery of said gasket, said ring being in a single transverse plane substantially common to said gasket and adapted to make continuous contact with the seating surfaces for secondary sealing outwardly of said gasket, said retaining ring providing a backup for and limiting the compression of said encircled gasket, said ring being made of solid wire stock or the like having a thickness less than the initial gasket thickness, there being lugs secured to the ring at circumferentially spaced points on its outer periphery, each of said lugs having a cross-sectional-shape and dimension corresponding to those of said ring and formed with divergent arms to achieve an embracing relation to bolt fasteners mounted outwardly of the sealing assembly, the outer ends of said divergent arms being spaced apart, said lugs being in a common transverse plane with said ring and being correspondingly formed of the same solid wire stock or the like and having a corresponding thickness.

2. A sealing assembly according to claim 1, characterized in that said gasket is normally round in cross section and assumes an out of round configuration under compression, said retaining ring being round in cross section for approximately line sealing contact with seating surfaces outwardly of an encircled gasket, said retaining ring being a wire welded at abutting ends and said lugs being wire segments preformed and welded to the ring exterior.